United States Patent
French, Jr. et al.

(10) Patent No.: US 9,807,932 B2
(45) Date of Patent: Nov. 7, 2017

(54) PROBABILISTIC CONTROL OF AN AGRICULTURAL MACHINE

(71) Applicant: Deere & Company, Moline, IL (US)

(72) Inventors: William D. French, Jr., Bettendorf, IA (US); Aaron J. Bruns, Bettendorf, IA (US); Janos Kis, Hosszuheteny (HU)

(73) Assignee: Deere & Company, Moline, IL (US)

( * ) Notice: Subject to any disclaimer, the term of this patent is extended or adjusted under 35 U.S.C. 154(b) by 0 days.

(21) Appl. No.: 14/874,223

(22) Filed: Oct. 2, 2015

(65) Prior Publication Data

US 2017/0094901 A1 Apr. 6, 2017

(51) Int. Cl.

| | | |
|---|---|---|
| G06F 7/70 | (2006.01) | |
| A01D 41/127 | (2006.01) | |
| A01F 12/18 | (2006.01) | |
| A01F 12/44 | (2006.01) | |
| A01F 12/46 | (2006.01) | |
| G06Q 10/06 | (2012.01) | |
| G06Q 50/02 | (2012.01) | |

(52) U.S. Cl.
CPC ....... *A01D 41/127* (2013.01); *A01D 41/1273* (2013.01); *A01F 12/18* (2013.01); *A01F 12/444* (2013.01); *A01F 12/446* (2013.01); *A01F 12/46* (2013.01); *G06Q 10/0639* (2013.01); *G06Q 50/02* (2013.01)

(58) Field of Classification Search
CPC ....... A01D 41/127; A01F 12/18; A01F 12/44; A01F 12/46
USPC ....................... 701/50; 460/1, 4–6
See application file for complete search history.

(56) References Cited

U.S. PATENT DOCUMENTS

| | | | |
|---|---|---|---|
| 5,995,895 A | 11/1999 | Watt et al. | |
| 6,553,300 B2 | 4/2003 | Ma et al. | |
| 6,726,559 B2 | 4/2004 | Bischoff | |
| 7,713,115 B2* | 5/2010 | Behnke | A01D 41/1276 340/684 |
| 8,469,784 B1* | 6/2013 | Hoskinson | A01D 41/127 460/1 |
| 2002/0107625 A1* | 8/2002 | Beck | A01D 41/127 701/50 |
| 2009/0299496 A1* | 12/2009 | Cade | G05B 13/024 700/29 |
| 2014/0129192 A1 | 5/2014 | Blank et al. | |
| 2015/0199360 A1 | 7/2015 | Pfeiffer | |
| 2016/0202227 A1* | 7/2016 | Mathur | G06Q 50/02 702/2 |

FOREIGN PATENT DOCUMENTS

| | | |
|---|---|---|
| EP | 2586286 A1 | 5/2013 |
| WO | 2012007549 A1 | 1/2012 |

OTHER PUBLICATIONS

Extended European Search Report Application No. 16187244.5 dated Jan. 3, 2017, 9 pages.

\* cited by examiner

*Primary Examiner* — Thomas G Black
*Assistant Examiner* — Luke Huynh
(74) *Attorney, Agent, or Firm* — Joseph R. Kelly; Kelly, Holt & Christenson PLLC

(57) ABSTRACT

A set of sensor inputs are received in an agricultural machine. The sensor inputs are indicative of sensed or measured variables. A probabilistic control system probabilistically infers values for another set of variables and generates a set of control signals based on the probabilistically inferred values.

15 Claims, 9 Drawing Sheets

PROBABILISTIC CONTROL OF AN AGRICULTURAL MACHINE

FIELD OF THE DESCRIPTION

The present description relates to controlling the operation of an agricultural machine. More specifically, the present description relates to controlling the operation of an agricultural machine using a probabilistic controller.

BACKGROUND

There are a wide variety of different types of agricultural machines. Some such machines can be quite difficult to operate, based upon the complex nature of the machine.

By way of example, harvesting machines, such as combines, can have many different operator controllable settings. The best value for each of those settings may vary based on a wide variety of different types of criteria. For instance, the optimum settings on a combine may vary based upon crop type, weather conditions, soil conditions, the characteristics of the crop, the topology of the field, etc.

Some current types of control systems on agricultural machines are multiple-input, multiple-output control systems. Such control systems receive inputs from a variety of different sources, and generate output signals, used to control the machine, based upon those input signals. Such controllers have relied on deterministic control methods. For instance, some controllers receive the input values and use them to perform a lookup operation on one or more lookup tables. The information in the lookup tables may be derived from expert operators or experimental data, or in other ways.

The discussion above is merely provided for general background information and is not intended to be used as an aid in determining the scope of the claimed subject matter.

SUMMARY

A set of sensor inputs are received in an agricultural machine. The sensor inputs are indicative of sensed or measured variables. A probabilistic control system probabilistically infers values for another set of variables and generates a set of control signals based on the probabilistically inferred values.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter. The claimed subject matter is not limited to implementations that solve any or all disadvantages noted in the background.

DETAILED DESCRIPTION

Figure 1:
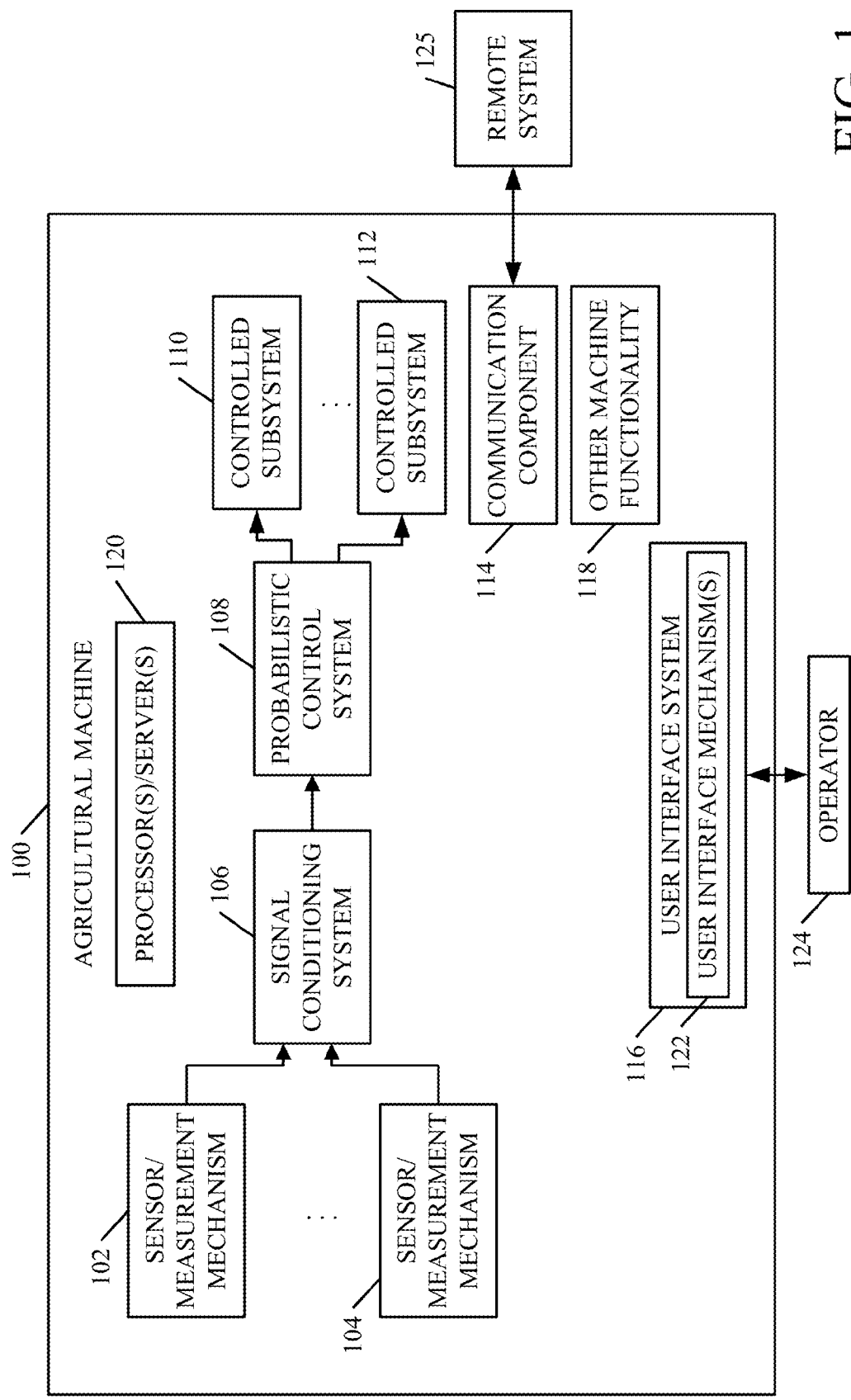
FIG. 1 is a block diagram of one example of an agricultural machine.

FIG. 1 is a block diagram of one example of an agricultural machine 100. Machine 100 illustratively has a set of sensors or measurement mechanisms 102-104. Machine 100 also illustratively also includes signal conditioning system 106, probabilistic control system 108, a set of controlled subsystems 110-112, communication component 114, user interface system 116, and it can include a variety of other machine functionality 118. Machine 100 is also shown with one or more processors or servers 120.

In one example, user interface system 116 illustratively includes a set of user interface mechanisms 122. Operator 124 can interact with user interface mechanisms 122 in order to control and manipulate agricultural machine 100. In one example, mechanisms 122 include one or more display devices, audio devices for providing audio information, haptic devices that provide haptic feedback, levers, joysticks, steering wheels, pedals, buttons, etc. User interface mechanisms 122 can also be a set of input mechanisms displayed on a user interface display. For instance, they can be links, icons, or other user actuatable mechanisms.

Sensors or mechanisms 102-104 illustratively generate signals representative of sensed variables, and provide them to signal conditioning system 106. Signal conditioning mechanism 106 can perform a wide variety of different kinds of signal conditioning. For instance, it can perform amplification, linearization, normalization, filtering, etc.

Probabilistic control system 108 receives signals (either directly from sensors or mechanisms 102-104, or after they have been conditioned by system 106) and generates a set of control signals that it uses to control the various controlled subsystems 110-112 on agricultural machine 100. Communication component 114 is also shown communicating with one or more remote systems 125. Communication component 114 can communicate a wide variety of different types of information to and from remote systems 125. Some of this is described in greater detail below.

Figure 2:
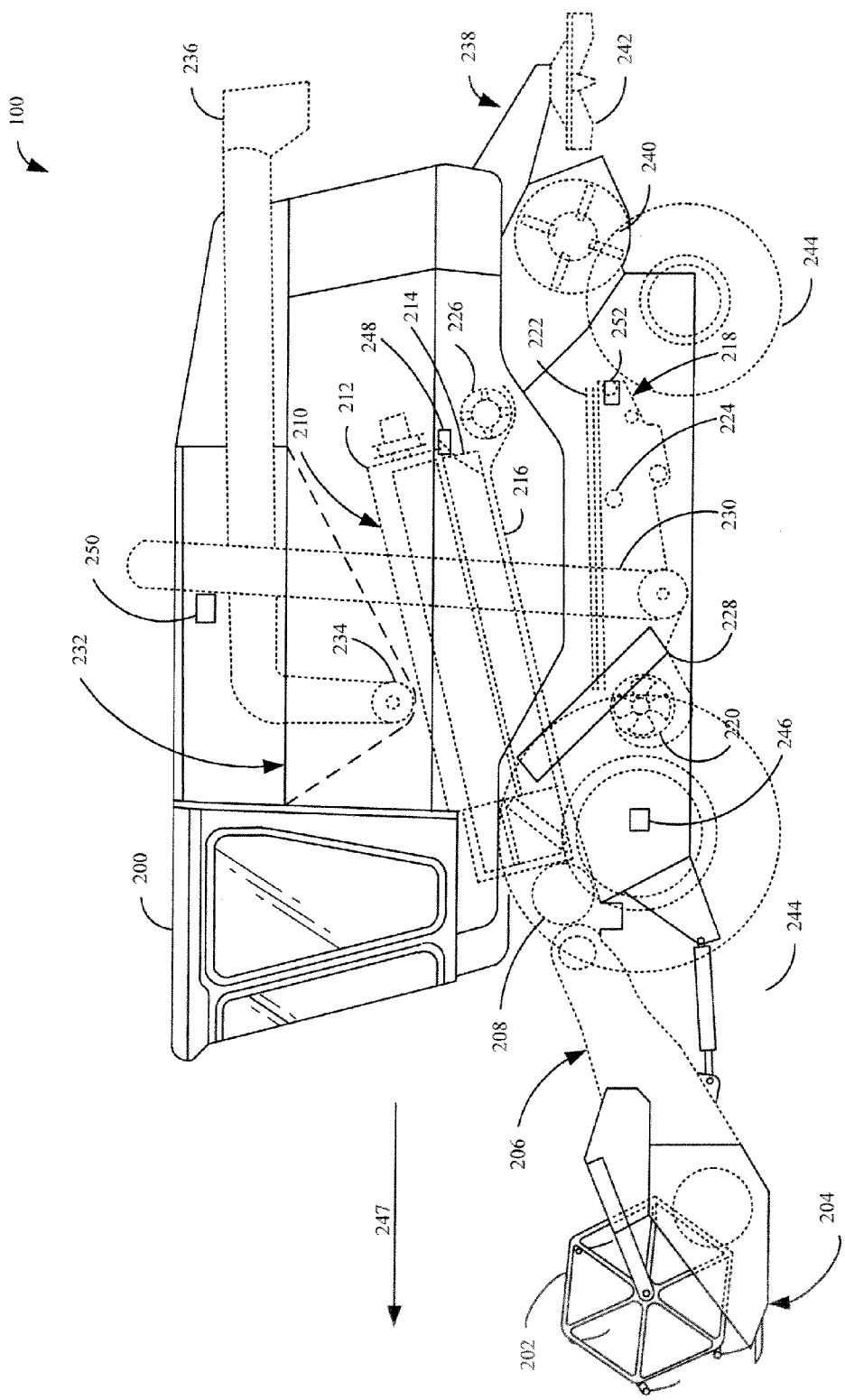
FIG. 2 is a pictorial, partial schematic view of one example of a combine.

FIG. 2 is a partial pictorial, partial schematic illustration of machine 100, in an example where machine 100 is a combine. It can be seen in FIG. 2 that combine 100 illustratively includes an operator compartment 200, and a set of front end equipment that can include header 202, and a cutter generally indicated at 204. It can also include a feeder house 206, a feed accelerator 208, and a thresher generally indicated at 210. Thresher 210 illustratively includes a threshing rotor 212 and a set of concaves 214. Further, combine 100 can include a separator 216 that includes a separator rotor. Combine 102 can include a cleaning subsystem (or cleaning shoe) 218 that, itself, can include a cleaning fan 220, chaffer 222 and sieve 224. The material handling subsystem in combine 102 can include (in addition to a feederhouse 206 and feed accelerator 208) discharge beater 226, tailings elevator 228, clean grain elevator 230 (that moves clean grain into clean grain tank 232) as well as unloading auger 234 and spout 236. Combine 102 can further include a residue subsystem 238 that can include chopper 240 and spreader 242. Combine 102 can also have a propulsion subsystem that includes an engine that drives ground engaging wheels 244 or tracks, etc. It will be noted that combine 102 may also have more than one of any of the subsystems mentioned above (such as left and right cleaning shoes, separators, etc.).

In operation, and by way of overview, combine 102 illustratively moves through a field in the direction indicated by arrow 247. As it moves, header 202 engages the crop to be harvested and gathers it toward cutter 204. After it is cut, it is moved through a conveyor in feeder house 206 toward feed accelerator 208, which accelerates the crop into thresher 210. The crop is threshed by rotor 212 rotating the crop against concave 214. The threshed crop is moved by a separator rotor in separator 216 where some of the residue is moved by discharge beater 226 toward the residue subsystem 238. It can be chopped by residue chopper 240 and spread on the field by spreader 242. In other implementations, the residue is simply dropped in a windrow, instead of being chopped and spread.

Grain falls to cleaning shoe (or cleaning subsystem) 218. Chaffer 222 separates some of the larger material from the grain, and sieve 224 separates some of the finer material from the clean grain. Clean grain falls to an auger in clean grain elevator 230, which moves the clean grain upward and deposits it in clean grain tank 232. Residue can be removed from the cleaning shoe 218 by airflow generated by cleaning fan 220. That residue can also be moved rearwardly in combine 102 toward the residue handling subsystem 238.

Tailings can be moved by tailings elevator 228 back to thresher 210 where they can be re-threshed. Alternatively, the tailings can also be passed to a separate re-threshing mechanism (also using a tailings elevator or another transport mechanism) where they can be re-threshed as well.

FIG. 2 also shows that, in one example, combine 102 can include ground speed sensor 246, one or more separator loss sensors 248, a clean grain camera 250, and one or more cleaning shoe loss sensors 252. Ground speed sensor 246 illustratively senses the travel speed of combine 102 over the ground. This can be done by sensing the speed of rotation of the wheels, the drive shaft, the axel, or other components. The travel speed can also be sensed by a positioning system, such as a global positioning system (GPS), a dead reckoning system, a LORAN system, or a wide variety of other systems or sensors that provide an indication of travel speed.

Cleaning shoe loss sensors 252 illustratively provide an output signal indicative of the quantity of grain loss by both the right and left sides of the cleaning shoe 218. In one example, sensors 252 are strike sensors which count grain strikes per unit of time (or per unit of distance traveled) to provide an indication of the cleaning shoe grain loss. The strike sensors for the right and left sides of the cleaning shoe can provide individual signals, or a combined or aggregated signal. It will be noted that sensors 252 can comprise only a single sensor as well, instead of separate sensors for each shoe.

Separator loss sensor 248 provides a signal indicative of grain loss in the left and right separators. The sensors associated with the left and right separators can provide separate grain loss signals or a combined or aggregate signal. This can be done using a wide variety of different types of sensors as well. It will be noted that separator loss sensors 248 may also comprise only a single sensor, instead of separate left and right sensors.

It will also be appreciated that sensor/measurement mechanisms 102-104 (in addition to the sensors already described) can include other sensors on combine 100 as well. For instance, they can include a machine state sensor that is configured to sense whether machine 100 is configured to chop the residue, drop a windrow, etc. They can include cleaning shoe fan speed sensors that can be configured proximate fan 220 to sense the speed of the fan. They can include a material other than grain (MOG) moisture sensor that can be configured to sense the moisture level of the material other than grain that is passing through machine 100. They can include machine setting sensors that are configured to sense the various configurable settings on machine 100. They can also include a machine orientation sensor that can be any of a wide variety of different types of sensors that sense the orientation of machine 100. Crop property sensors can sense a variety of different types of crop properties, such as crop type, crop moisture, and other crop properties. They can also be configured to sense characteristics of the crop as they are being processed by machine 100. For instance, they can sense grain feed rate, as it travels through clean grain elevator 230. They can sense mass flow rate through elevator 230, or provide other output signals indicative of similar variables. Some additional examples of the types of sensors that can be used are described below with respect to FIG. 3.

Figure 3:
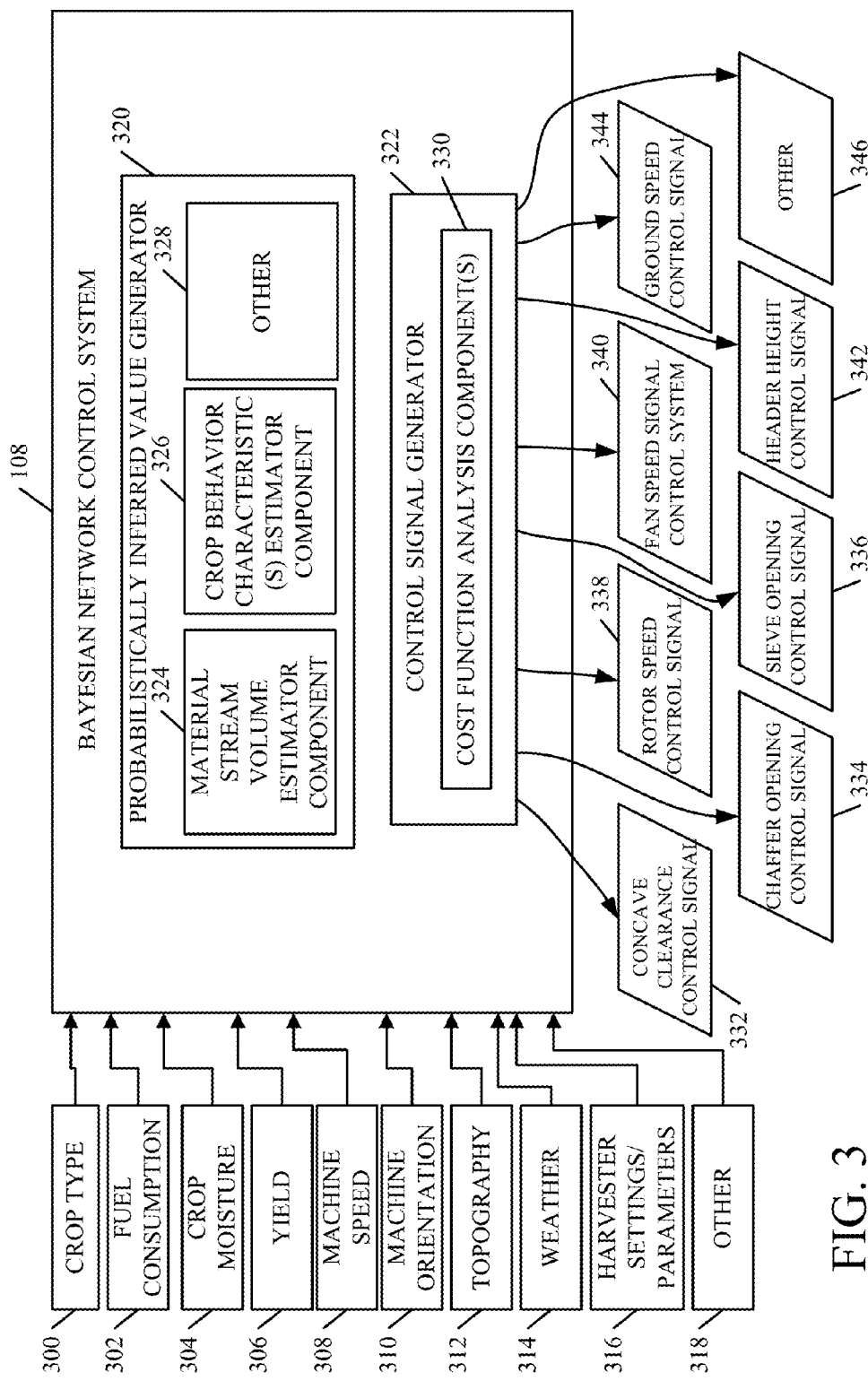
FIG. 3 is a more detailed block diagram of one example of a control system.

FIG. 3 is a block diagram illustrating one example of probabilistic control system 108, and sensors or measurement mechanisms 102-104, in more detail. In the example shown in FIG. 3, the sensors or measurement mechanisms 102-104 illustratively include a crop type sensor 300, fuel consumption sensor 302, crop moisture sensor 304, yield sensor 306, machine speed sensor 308, machine orientation sensor 310, topography sensor 312, weather sensor 314, a set of harvester settings or parameters 316, and it can include a wide variety of different or other inputs 318 as well. It will be noted that the various sensors or measurement mechanisms 300-318 can be mechanisms that directly measure the sensed variables, or they can be components that generate an estimation of the sensed variables from other sensor inputs. For instance, yield sensor 306 may sense mass flow rate of product through the clean grain elevator, and generate a metric indicative of yield, based upon that sensor input. This is but one example, and the sensors can take a wide variety of different forms as well.

In the example shown in FIG. 3, probabilistic control system 108 is illustratively a Bayesian network control system. Thus, it includes a probabilistically inferred value generator 320, and a control signal generator 322. Probabilistically inferred value generator 320 illustratively receives the various sensor inputs and computes the posterior probability distribution of another set of variables (which can be unobservable variables or other variables), given the inputs from the various sensors 300-318, as evidence variables.

For instance, generator 320 may generate an estimate of material stream volume using material stream volume estimator component 324. Component 324 may, for instance, generate an estimate of the material stream volume at various places within the combine, during operation. Crop behavior characteristics estimator component 326 may also generate an estimate of an unobservable variable, given the sensor inputs as evidence variables. For instance, component 326 may generate an estimate of different types of crop behavior characteristics as they are being processed. By way of example, component 326 may generate estimates of various threshing characteristics of the crop. One example of a threshing characteristic indicates how the crop behaves during the threshing operation. Threshing toughness, for instance, refers to how difficult it is to thresh a given crop. That is, assuming that the crop is corn, the threshing toughness characteristic may be a metric that provides an indication as to how difficult it is to remove the kernels of corn from the cob, as it is being threshed.

It will be noted that these are examples only. Probabilistically inferred value generator 320 can include other components 328 that generate a wide variety of other probabilistically inferred values.

A more detailed discussion of one example of system 108 may be helpful. A Bayesian network is formally a directed acyclical graph that has nodes connected by edges. Each node has a corresponding probability function that takes inputs as the values of parent nodes to which they are connected, by edges that represent dependency among the nodes. Each node represents a variable and the probability function provides an output indicative of the probability or probability distribution of a variable represented by the node, given the values of its parent nodes. A dynamic Bayesian network models sequences of random variables.

Thus, Bayesian network control system 108 illustratively uses knowledge of prior events to predict future events, in terms of the probabilistically inferred values generated by generator 320. Because the various unobserved variables are uncertain, control system 108 quantifies the uncertainty by using any background information (such as any previously observed values) and the sensor inputs from sensors 300-318, as evidence. Based on this evidence, generator 300 generates values that represent the degree of probability that the unobserved values are present.

A Bayesian network is generally considered to be a complete model for the variables (and their relationships) that it represents. Therefore, a Bayesian network can be used to discover updated knowledge of a state of a subset of variables, when other variables (those referred to as the evidence variables, such as the inputs from sensors 300-318) are observed. This is done by computing the posterior distribution of variables, given the evidence variables. This type of posterior distribution computation is referred to as probabilistic inference. Thus, components 324, 326 and 328 in generator 320 illustratively use probabilistic inference to identify the unobserved variables, based upon the observed variables.

Control signal generator 322 illustratively includes cost function analysis component 330. Control system 108 can implement one or more desired cost functions. The cost functions can be functions that represent different operational goals (such as fuel efficiency, crop loss minimization, etc.). Cost function analysis component 330 can generate the control signals for the various subsystems of the combine, in order to minimize the cost function or cost functions implemented in control signal generator 322.

FIG. 3 also shows that the control signals can control a wide variety of different subsystems. The signals can include, for instance, a concave clearance control signal 332. Control signal 332 can be provided to a concave clearance mechanism that controls the concave clearance of concave 214 in the threshing subsystem.

The control signals can also include chaffer opening control signal 334 and sieve opening control signal 336. Signals 334 and 336 can be provided to a subsystem that is used to control the chaffer openings and sieve openings, respectively, of chaffer 222 and sieve 224 in cleaning shoe 218.

The control signals can include rotor speed control signal 338. Signal 338 can be provided to a subsystem that is used to control the rotor speed of the threshing rotor 212 or the separator rotor in the separator subsystem.

The signals can include fan speed control signal 340 as well. Signal 340 can be provided to the cleaning subsystem and is used to control the fan speed of cleaning fan 220.

The control signals can include header height control signal 342, ground speed control signal 344, or other control signals 346. Signals 342-346 can be provided to subsystems that are used to control the header height of header 202, the ground speed of the machine, or other characteristics or controllable parameters.

Figure 4:
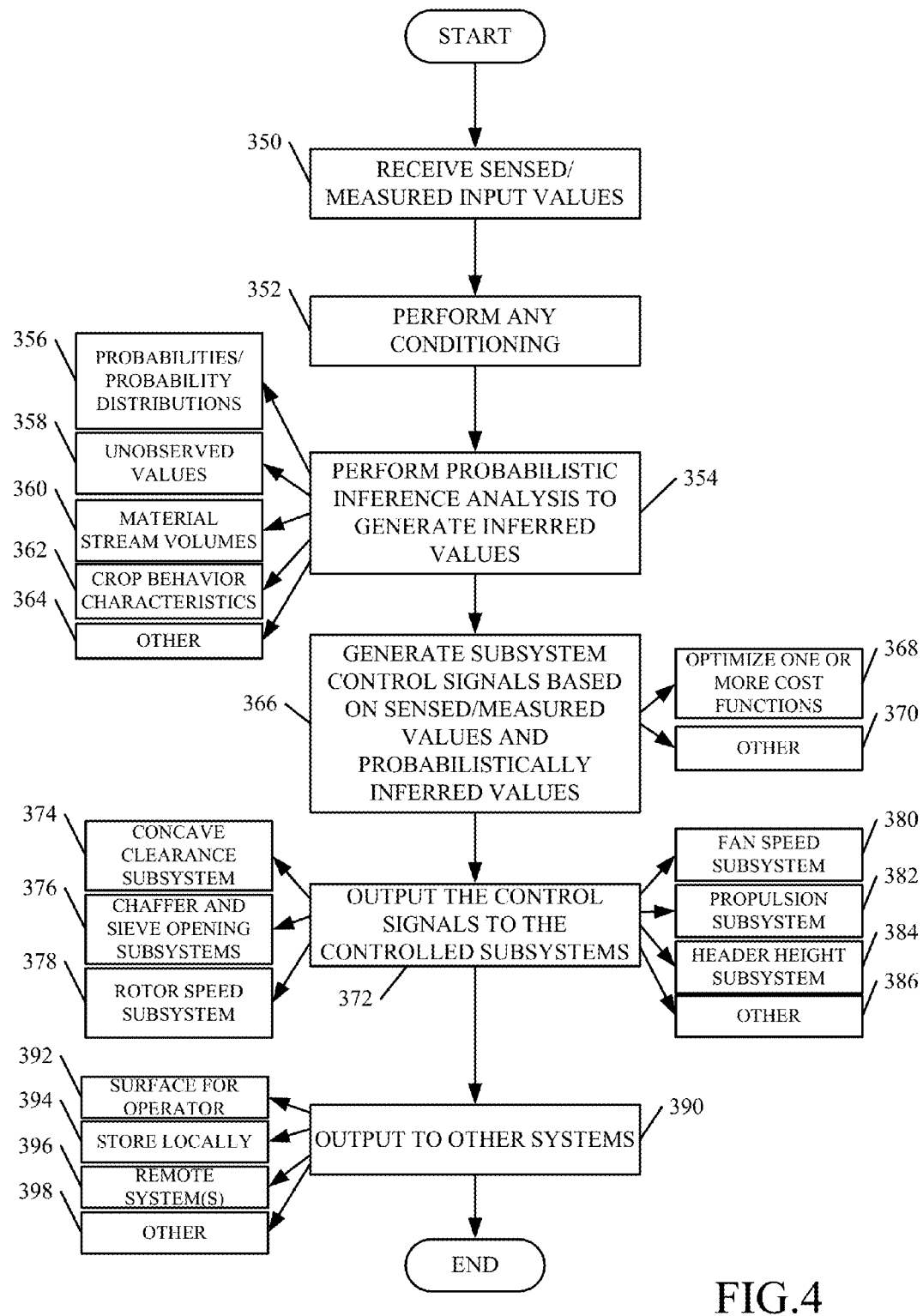
FIG. 4 is a flow diagram showing one example of the operation of the control system shown in FIG. 4.

FIG. 4 is a flow diagram illustrating one example of the operation of Bayesian network control system 108 when it is implemented on a combine. Controls system 108 first receives the sensed or measured input values from the various sensors or measurement mechanisms 300-318. This is indicated by block 350 in FIG. 4. The signal conditioning system 106 can perform any desired signal conditioning on those signals. This is indicated by block 352.

Probabilistically inferred value generator 320 then performs probabilistic inference analysis to generate the various inferred values. This is indicated by block 354. It should be noted that the values can be probabilities or probability distributions. This is indicated by block 356. They can be generated for unobserved variables. This is indicated by block 358. As examples, the values can be generated to estimate material stream volumes 360 at various points within the combine. They can also be used to estimate crop behavior characteristics 362, or a wide variety of other unobserved, or unobservable, variables. This is indicated by block 364. Control signal generator 322 then generates the subsystem control signals based upon the sensed or measured values and based upon the probabilistically inferred values. This is indicated by block 366. In doing so, it can optimize one or more cost functions as indicated by block 368. It can generate the probabilistic control signals in other ways as well. This is indicated by block 370.

Control system 108 then outputs the control signals to control the various controlled subsystems. This is indicated by block 372. For instance, they can control a concave clearance subsystem 374, a chaffer and sieve opening subsystem 376 and/or a rotor speed subsystem 378. The control signals can control a fan speed subsystem 380, a propulsion subsystem 382 and/or a header height subsystem 384. They can be used to control a wide variety of other subsystems 386 as well.

In addition, system 108 can output information about the control signals or the inferred variables, or other information generated by control system 108 to other systems. This is indicated by block 390 in FIG. 4. By way of example, control system 108 can control user interface system 116 to surface the information for operator 124. This is indicated by block 392. The information may be surfaced in a wide variety of different ways. For instance, it may be surfaced as a visual user interface display. It may be surfaced using audible warnings or notifications, or using haptic devices. It may be surfaced in other ways as well.

System 108 may output the information to store it locally on machine 100. This is indicated by block 394.

System 108 may also use communication component 114 to output the information to one or more remote systems 125. This is indicated by block 396.

The information can be output in a wide variety of other ways as well. This is indicated by block 398.

It can thus be seen that by providing probabilistic control on the agricultural machine 100, the present system provides a robust control system that can accommodate uncertainties in a highly accurate fashion. It should also be noted that, while the probabilistic control system has been described as being a Bayesian network control system, other probabilistic control systems can be used as well. For instance, the hidden or unobserved variables can be estimated using a hidden Markov process. The probabilistic control system can be implemented in other ways as well.

The present discussion has mentioned processors and servers. In one example, the processors and servers include computer processors with associated memory and timing circuitry, not separately shown. They are functional parts of the systems or devices to which they belong and are activated by, and facilitate the functionality of the other components or items in those systems.

Also, a number of user interface displays have been discussed. They can take a wide variety of different forms and can have a wide variety of different user actuatable input mechanisms disposed thereon. For instance, the user actuatable input mechanisms can be text boxes, check boxes, icons, links, drop-down menus, search boxes, etc. They can also be actuated in a wide variety of different ways. For instance, they can be actuated using a point and click device (such as a track ball or mouse). They can be actuated using hardware buttons, switches, a joystick or keyboard, thumb switches or thumb pads, etc. They can also be actuated using a virtual keyboard or other virtual actuators. In addition, where the screen on which they are displayed is a touch sensitive screen, they can be actuated using touch gestures. Also, where the device that displays them has speech recognition components, they can be actuated using speech commands.

A number of data stores have also been discussed. It will be noted they can each be broken into multiple data stores. All can be local to the systems accessing them, all can be remote, or some can be local while others are remote. All of these configurations are contemplated herein.

Also, the figures show a number of blocks with functionality ascribed to each block. It will be noted that fewer blocks can be used so the functionality is performed by fewer components. Also, more blocks can be used with the functionality distributed among more components.

It will also be noted that the information generated by subsystem 108 can be output to the cloud (or remote server system).

Figure 5:
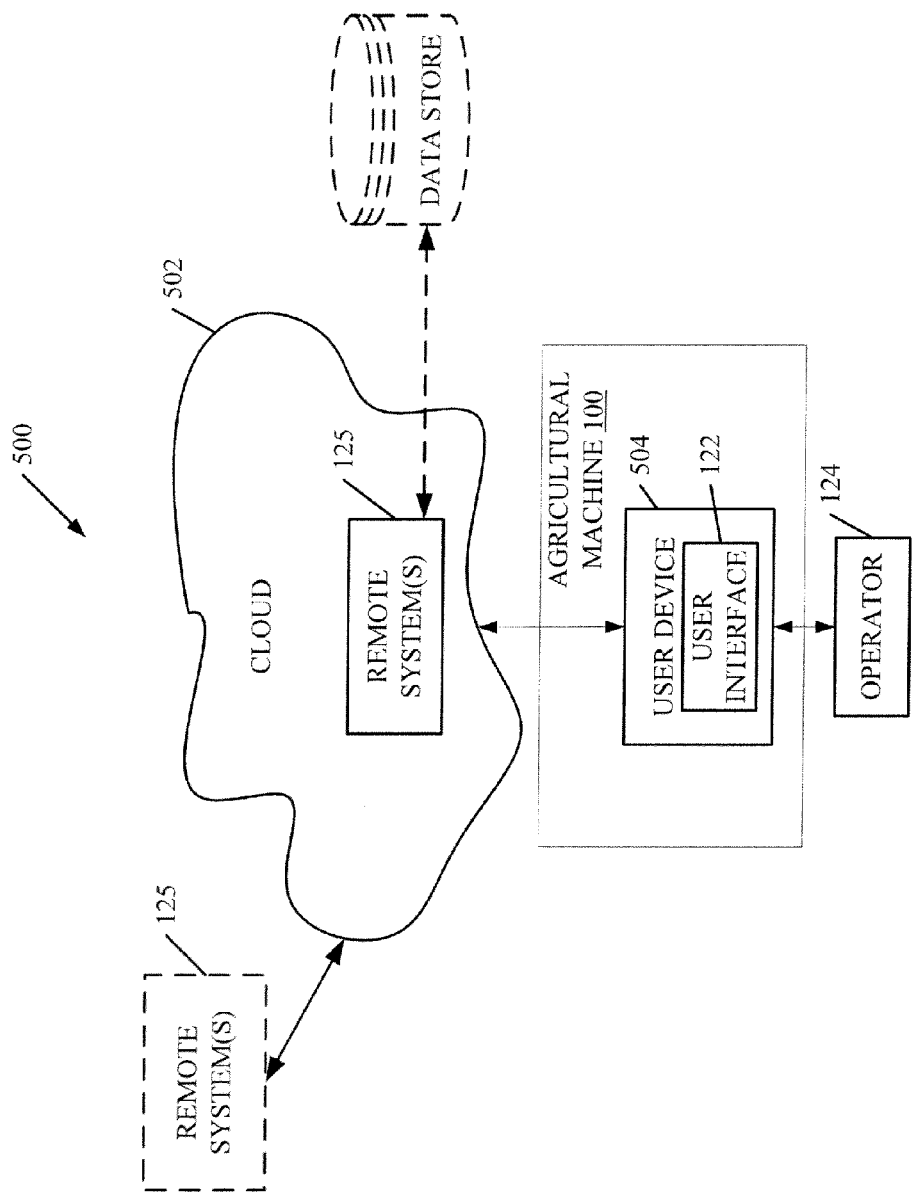
FIG. 5 is a block diagram of one example of a remote server architecture.

FIG. 5 is a block diagram of harvester 100, shown in FIG. 1, except that it communicates with elements in a remote server architecture 500. In an example, remote server architecture 500 can provide computation, software, data access, and storage services that do not require end-user knowledge of the physical location or configuration of the system that delivers the services. In various examples, remote servers can deliver the services over a wide area network, such as the internet, using appropriate protocols. For instance, remote servers can deliver applications over a wide area network and they can be accessed through a web browser or any other computing component. Software or components shown in FIG. 1 as well as the corresponding data, can be stored on servers at a remote location. The computing resources in a remote server environment can be consolidated at a remote data center location or they can be dispersed. Remote server infrastructures can deliver services through shared data centers, even though they appear as a single point of access for the user. Thus, the components and functions described herein can be provided from a remote server at a remote location using a remote server architecture. Alternatively, they can be provided from a conventional server, or they can be installed on client devices directly, or in other ways.

In the example shown in FIG. 5, some items are similar to those shown in FIG. 1 and they are similarly numbered. FIG. 5 specifically shows that remote systems 125 and storage 506 can be located at a remote server location 502. Therefore, harvester 100 accesses those systems through remote server location 502.

FIG. 5 also depicts another embodiment of a remote server architecture. FIG. 5 shows that it is also contemplated that some elements of FIG. 1 can be disposed at remote server location 502 while others are not. By way of example, remote storage 506 can be disposed at a location separate from location 502, and accessed through the remote server at location 502. Regardless of where they are located, they can be accessed directly by harvester 100, through a network (either a wide area network or a local area network), they can be hosted at a remote site by a service, or they can be provided as a service, or accessed by a connection service that resides in a remote location. Also, the data can be stored in substantially any location and intermittently accessed by, or forwarded to, interested parties. For instance, physical carriers can be used instead of, or in addition to, electromagnetic wave carriers. In such an embodiment, where cell coverage is poor or nonexistent, another mobile machine (such as a fuel truck) can have an automated information collection system. As the harvester comes close to the fuel truck for fueling, the system automatically collects the information from the harvester using any type of ad-hoc wireless connection. The collected information can then be forwarded to the main network as the fuel truck reaches a location where there is cellular coverage (or other wireless coverage). For instance, the fuel truck may enter a covered location when traveling to fuel other machines or when at a main fuel storage location. All of these architectures are contemplated herein. Further, the information can be stored on the harvester until the harvester enters a covered location. The harvester, itself, can then send the information to the main network.

It will also be noted that the elements of FIG. 1, or portions of them, can be disposed on a wide variety of different devices. Some of those devices include servers, desktop computers, laptop computers, tablet computers, or other mobile devices, such as palm top computers, cell phones, smart phones, multimedia players, personal digital assistants, etc.

Figure 6:
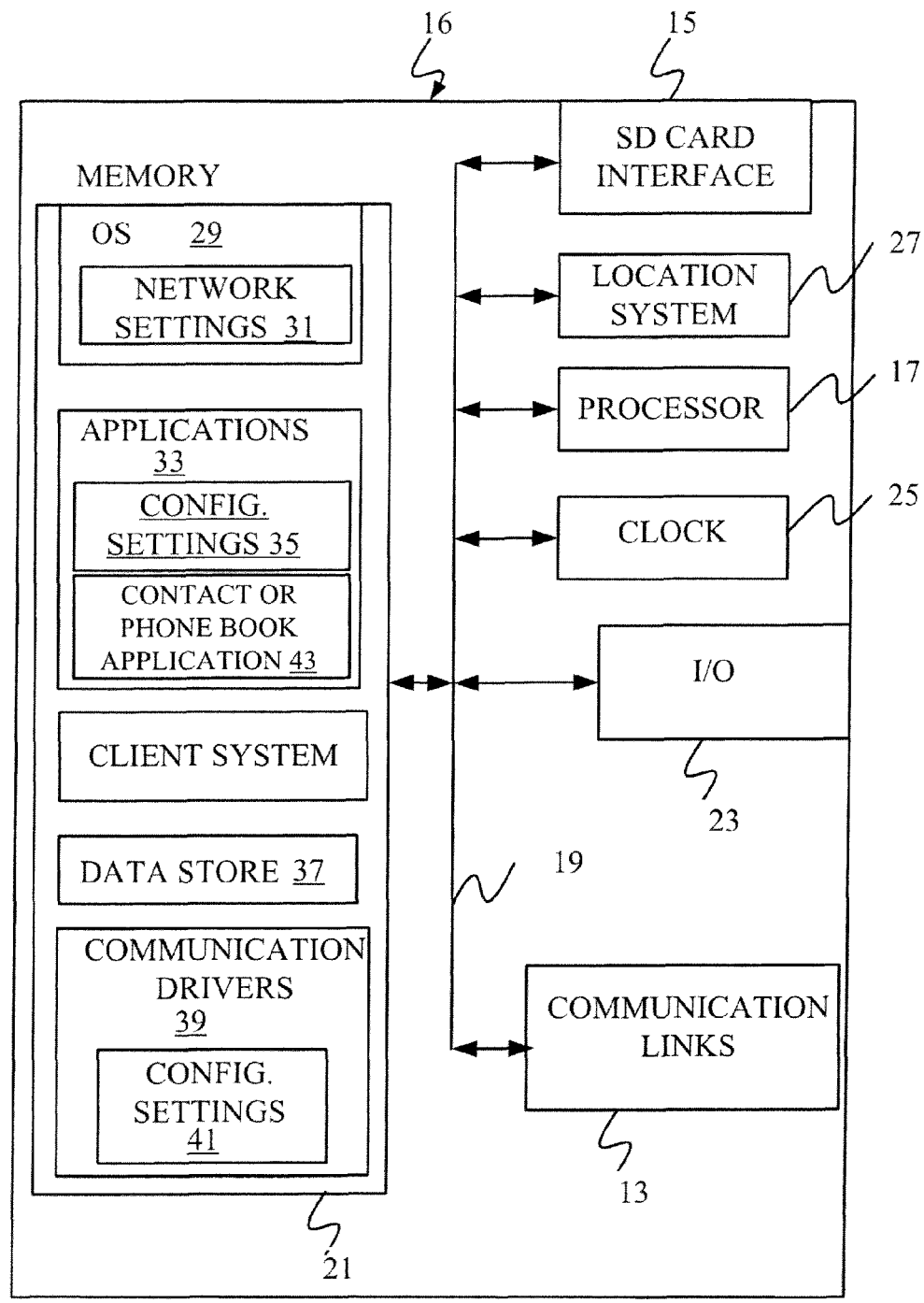
FIGS. 6-8 show examples of mobile devices.
Figure 7:
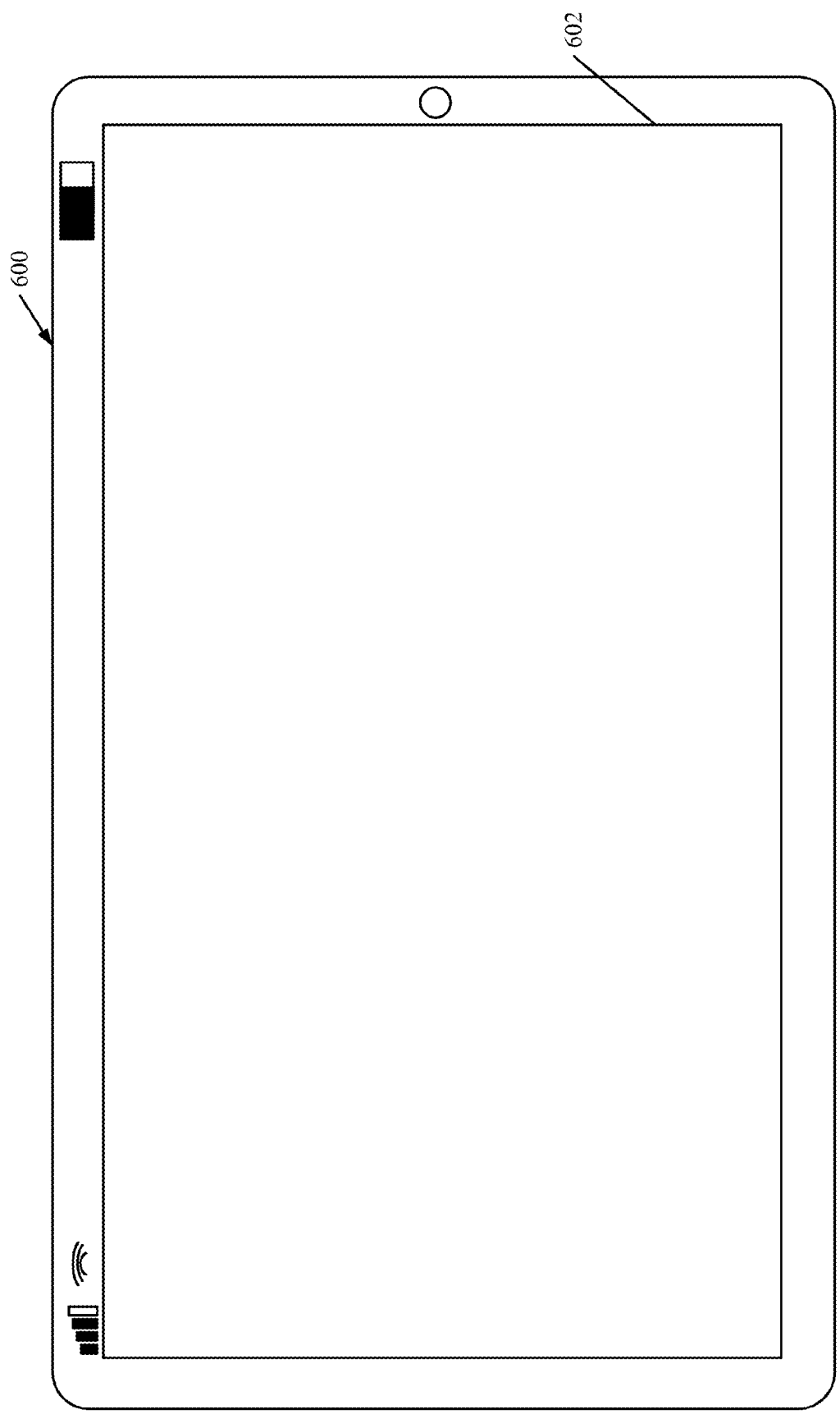
Figure 8:
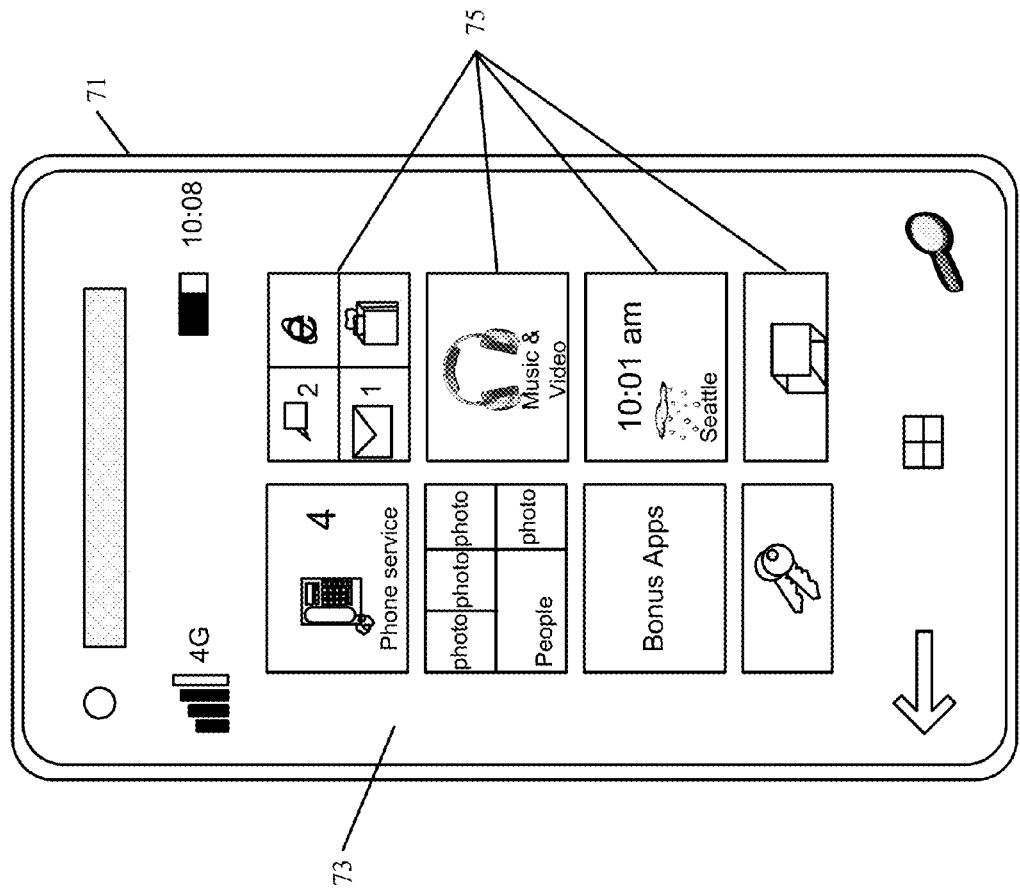
Figure 9:
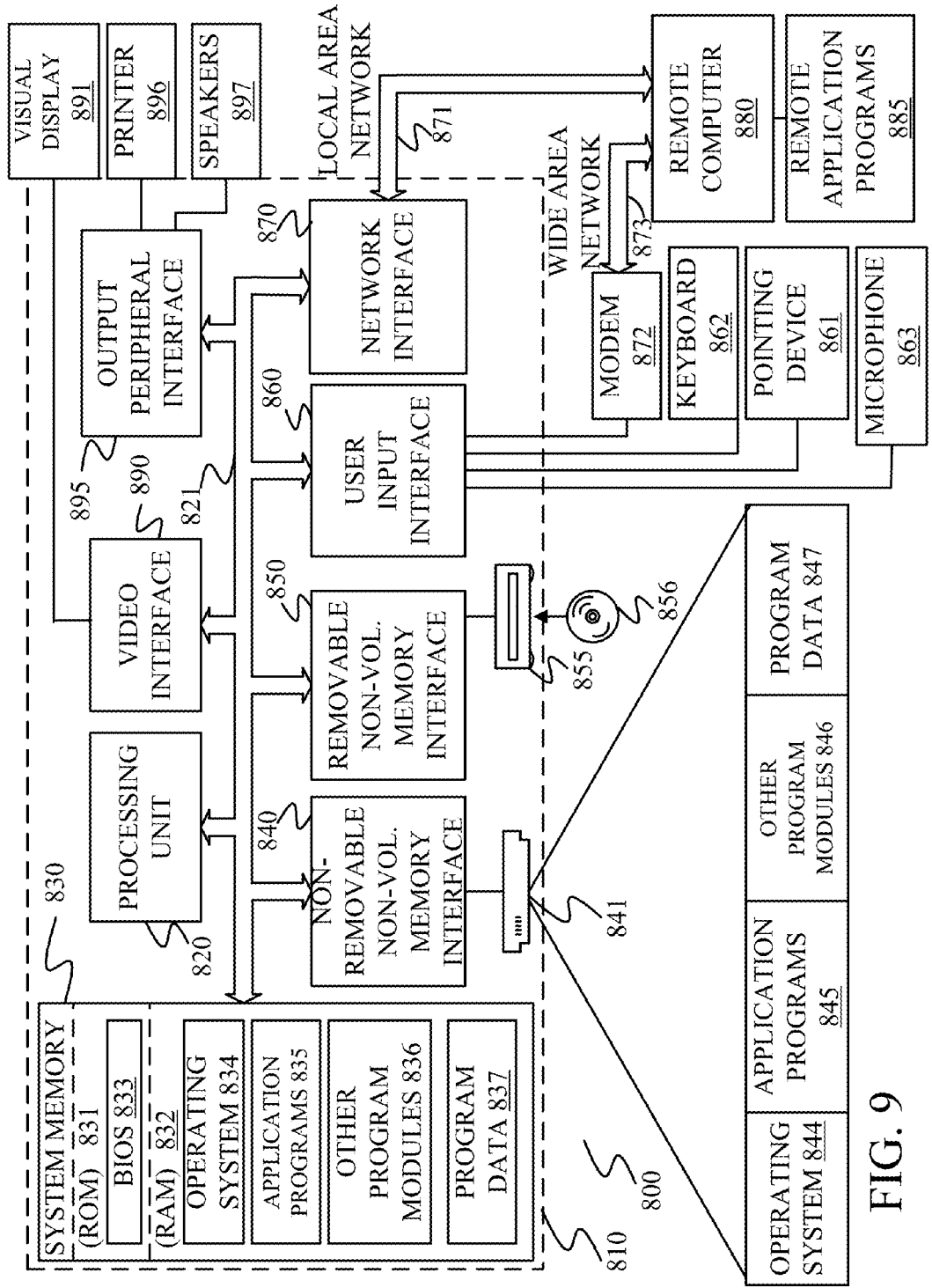
FIG. 9 is a block diagram of one example of a computing environment.

FIG. 6 is a simplified block diagram of one illustrative embodiment of a handheld or mobile computing device that can be used as a user's or client's hand held device 16, in which the present system (or parts of it) can be deployed. For instance, a mobile device can be deployed in the operator compartment of harvester 100 for use in generating, receiving, processing, or displaying the data. FIGS. 7-9 are examples of handheld or mobile devices.

FIG. 6 provides a general block diagram of the components of a client device 16 that can run some components shown in FIG. 1, that interacts with them, or both. In the device 16, a communications link 13 is provided that allows the handheld device to communicate with other computing devices and under some embodiments provides a channel for receiving information automatically, such as by scanning. Examples of communications link 13 include allowing communication though one or more communication protocols, such as wireless services used to provide cellular access to a network, as well as protocols that provide local wireless connections to networks.

In other examples, applications can be received on a removable Secure Digital (SD) card that is connected to an interface 15. Interface 15 and communication links 13 communicate with a processor 17 (which can also embody processors from previous FIGS.) along a bus 19 that is also connected to memory 21 and input/output (I/O) components 23, as well as clock 25 and location system 27.

I/O components 23, in one embodiment, are provided to facilitate input and output operations. I/O components 23 for various embodiments of the device 16 can include input components such as buttons, touch sensors, optical sensors, microphones, touch screens, proximity sensors, accelerometers, orientation sensors and output components such as a display device, a speaker, and or a printer port. Other I/O components 23 can be used as well.

Clock 25 illustratively comprises a real time clock component that outputs a time and date. It can also, illustratively, provide timing functions for processor 17.

Location system 27 illustratively includes a component that outputs a current geographical location of device 16. This can include, for instance, a global positioning system (GPS) receiver, a LORAN system, a dead reckoning system, a cellular triangulation system, or other positioning system. It can also include, for example, mapping software or navigation software that generates desired maps, navigation routes and other geographic functions.

Memory 21 stores operating system 29, network settings 31, applications 33, application configuration settings 35, data store 37, communication drivers 39, and communication configuration settings 41. Memory 21 can include all types of tangible volatile and non-volatile computer-readable memory devices. It can also include computer storage media (described below). Memory 21 stores computer readable instructions that, when executed by processor 17, cause the processor to perform computer-implemented steps or functions according to the instructions. Processor 17 can be activated by other components to facilitate their functionality as well.

FIG. 7 shows one embodiment in which device 16 is a tablet computer 600. In FIG. 7, computer 600 is shown with user interface display screen 602. Screen 602 can be a touch screen or a pen-enabled interface that receives inputs from a pen or stylus. It can also use an on-screen virtual keyboard. Of course, it might also be attached to a keyboard or other user input device through a suitable attachment mechanism, such as a wireless link or USB port, for instance. Computer 600 can also illustratively receive voice inputs as well.

FIG. 8 shows that the device can be a smart phone 71. Smart phone 71 has a touch sensitive display 73 that displays icons or tiles or other user input mechanisms 75. Mechanisms 75 can be used by a user to run applications, make calls, perform data transfer operations, etc. In general, smart phone 71 is built on a mobile operating system and offers more advanced computing capability and connectivity than a feature phone.

Note that other forms of the devices 16 are possible.

FIG. 9 is one example of a computing environment in which elements of FIG. 1, or parts of it, (for example) can be deployed. With reference to FIG. 9, an example system for implementing some embodiments includes a general-purpose computing device in the form of a computer 810. Components of computer 810 may include, but are not limited to, a processing unit 820 (which can comprise processors from previous FIGS.), a system memory 830, and a system bus 821 that couples various system components including the system memory to the processing unit 820. The system bus 821 may be any of several types of bus structures including a memory bus or memory controller, a peripheral bus, and a local bus using any of a variety of bus architectures. Memory and programs described with respect to FIG. 1 can be deployed in corresponding portions of FIG. 9.

Computer 810 typically includes a variety of computer readable media. Computer readable media can be any available media that can be accessed by computer 810 and includes both volatile and nonvolatile media, removable and non-removable media. By way of example, and not limitation, computer readable media may comprise computer storage media and communication media. Computer storage media is different from, and does not include, a modulated data signal or carrier wave. It includes hardware storage media including both volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical disk storage, magnetic cassettes, magnetic tape, magnetic disk storage or other magnetic storage devices, or any other medium which can be used to store the desired information and which can be accessed by computer 810. Communication media may embody computer readable instructions, data structures, program modules or other data in a transport mechanism and includes any information delivery media. The term "modulated data signal" means a signal that has one or more of its characteristics set or changed in such a manner as to encode information in the signal.

The system memory 830 includes computer storage media in the form of volatile and/or nonvolatile memory such as read only memory (ROM) 831 and random access memory (RAM) 832. A basic input/output system 833 (BIOS), containing the basic routines that help to transfer information between elements within computer 810, such as during start-up, is typically stored in ROM 831. RAM 832 typically contains data and/or program modules that are immediately accessible to and/or presently being operated on by processing unit 820. By way of example, and not limitation, FIG. 9 illustrates operating system 834, application programs 835, other program modules 836, and program data 837.

The computer 810 may also include other removable/non-removable volatile/nonvolatile computer storage media. By way of example only, FIG. 9 illustrates a hard disk drive 841 that reads from or writes to non-removable, nonvolatile magnetic media, an optical disk drive 855, and nonvolatile optical disk 856. The hard disk drive 841 is typically connected to the system bus 821 through a non-removable memory interface such as interface 840, and optical disk drive 855 are typically connected to the system bus 821 by a removable memory interface, such as interface 850.

Alternatively, or in addition, the functionality described herein can be performed, at least in part, by one or more hardware logic components. For example, and without limitation, illustrative types of hardware logic components that can be used include Field-programmable Gate Arrays (FPGAs), Application-specific Integrated Circuits (e.g., ASICs), Application-specific Standard Products (e.g., ASSPs), System-on-a-chip systems (SOCs), Complex Programmable Logic Devices (CPLDs), etc.

The drives and their associated computer storage media discussed above and illustrated in FIG. 9, provide storage of computer readable instructions, data structures, program modules and other data for the computer 810. In FIG. 9, for example, hard disk drive 841 is illustrated as storing operating system 844, application programs 845, other program modules 846, and program data 847. Note that these components can either be the same as or different from operating system 834, application programs 835, other program modules 836, and program data 837.

A user may enter commands and information into the computer 810 through input devices such as a keyboard 862, a microphone 863, and a pointing device 861, such as a mouse, trackball or touch pad. Other input devices (not shown) may include a joystick, game pad, satellite dish, scanner, levers, buttons, steering wheels, foot pedals, or the like. These and other input devices are often connected to the processing unit 820 through a user input interface 860 that is coupled to the system bus, but may be connected by other interface and bus structures. A visual display 891 or other type of display device is also connected to the system bus 821 via an interface, such as a video interface 890. In addition to the monitor, computers may also include other peripheral output devices such as speakers 897 and printer 896, which may be connected through an output peripheral interface 895.

The computer 810 is operated in a networked environment using logical connections (such as a local area network—LAN, or wide area network WAN) to one or more remote computers, such as a remote computer 880.

When used in a LAN networking environment, the computer 810 is connected to the LAN 871 through a network interface or adapter 870. When used in a WAN networking environment, the computer 810 typically includes a modem 872 or other means for establishing communications over the WAN 873, such as the Internet. In a networked environment, program modules may be stored in a remote memory storage device. FIG. 9 illustrates, for example, that remote application programs 885 can reside on remote computer 880.

It should also be noted that the different embodiments described herein can be combined in different ways. That is, parts of one or more embodiments can be combined with parts of one or more other embodiments. All of this is contemplated herein.

Example 1 is an agricultural mobile machine, comprising:
    a plurality of different sensors, each sensing a different variable and generating a corresponding sensor signal indicative of the sensed variable;
    a plurality of different controllable subsystems; and
    a probabilistic controller configured to receive the sensor signals and generate a set of estimated variable values for unobserved variables and generate a plurality of different subsystem control signals to control the plurality of different subsystems, based on the sensor signals and the estimated variable values for the unobserved variables.

Example 2 is the agricultural mobile machine of any or all previous examples wherein the agricultural mobile machine comprises a combine.

Example 3 is the agricultural mobile machine of any or all previous examples wherein the probabilistic controller comprises:
    a probabilistically inferred value generator that generates the estimated variable values for the unobserved variables; and
    a control signal generator that generates the plurality of different subsystem control signals.

Example 4 is the agricultural mobile machine of any or all previous examples wherein the combine includes a material processing system that processes material in a harvesting operation and wherein the probabilistically inferred value generator comprises:
    a material stream volume estimator component that generates estimated values indicative of material volumes at different places in in the material processing system during the harvesting operation.

Example 5 is the agricultural mobile machine of any or all previous examples wherein the probabilistically inferred value generator comprises:
    a crop behavior characteristic estimator component that generates estimated values indicative of processing characteristics of a crop being harvested during the harvesting operation.

Example 6 is the agricultural mobile machine of any or all previous examples wherein the control signal generator comprises:
    a cost function analysis component that generates the plurality of different subsystem control signals based on a cost function and the estimated values estimated by the material stream volume estimator component and the crop behavior characteristic estimator component.

Example 7 is the agricultural mobile machine of any or all previous examples wherein one of the plurality of subsystems comprises a threshing subsystem that includes a concave and a rotor, and wherein one of the plurality of subsystem control signals comprises:
    a concave clearance signal that controls concave clearance in the threshing subsystem.

Example 8 is the agricultural mobile machine of any or all previous examples wherein another of the plurality of subsystem control signals comprises:
    a rotor speed control signal that controls rotor speed in the threshing subsystem.

Example 9 is the agricultural mobile machine of any or all previous examples wherein one of the plurality of subsystems comprises a cleaning subsystem that includes a chaffer, a sieve and a fan, and wherein one of the plurality of subsystem control signals comprises:
    a chaffer opening control signal that controls a chaffer opening in the cleaning subsystem.

Example 10 is the agricultural mobile machine of any or all previous examples wherein another of the plurality of subsystem control signals comprises:
    a sieve opening control signal that controls a sieve opening in the cleaning subsystem.

Example 11 is the agricultural mobile machine of any or all previous examples wherein another of the plurality of subsystem control signals comprises:
    a fan speed control signal that controls a speed of the fan in the cleaning subsystem.

Example 12 is the agricultural mobile machine of any or all previous examples wherein one of the plurality of subsystems comprises a machine propulsion subsystem that drives movement of the combine over the ground and wherein one of the plurality of subsystem control signals comprises:
    a ground speed control signal that controls the propulsion subsystem.

Example 13 is the agricultural mobile machine of any or all previous examples wherein one of the plurality of subsystems comprises a front end equipment subsystem with a header motor that controls header height of a header and wherein one of the plurality of subsystem control signals comprises:
    a header height control signal that controls the header motor in the front end equipment subsystem.

Example 14 is the agricultural mobile machine of any or all previous examples wherein the probabilistic controller comprises:
    a Bayesian network controller.

Example 15 is the agricultural mobile machine of any or all previous examples wherein the probabilistic controller models the unobserved variables using a hidden Markov model.

Example 16 is a combine, comprising:
a plurality of different sensors, each sensing a different variable and generating a corresponding sensor signal indicative of the sensed variable;
a plurality of different controllable subsystems; and
a probabilistic controller configured to receive the sensor signals and generate a set of estimated variable values for unobserved variables and generate a plurality of different subsystem control signals to control the plurality of different subsystems, based on the sensor signals and the estimated variable values for the unobserved variables.

Example 17 is the combine of any or all previous examples and further comprising a material processing system that processes material in a harvesting operation, and wherein the probabilistic controller comprises:
a material stream volume estimator component that generates estimated values indicative of material volumes at different places in in the material processing system during the harvesting operation;
a crop behavior characteristic estimator component that generates estimated values indicative of processing characteristics of a crop being harvested during the harvesting operation; and
a control signal generator that generates the plurality of different subsystem control signals based on the sensor signals and the estimated values.

Example 18 is a method of controlling a combine, comprising:
sensing a plurality of different variables;
generating a corresponding sensor signal indicative of each of the sensed variables;
probabilistically generating a set of estimated variable values for unobserved variables based on the sensor signals; and
generating a plurality of different subsystem control signals to control a plurality of different subsystems, based on the sensor signals and the estimated variable values for the unobserved variables.

Example 19 is the method of any or all previous examples wherein the combine includes a material processing system that processes material in a harvesting operation, and wherein probabilistically generating the set of estimated variable values comprises:
generating estimated values indicative of material volumes at different places in in the material processing system during the harvesting operation; and
generating estimated values indicative of processing characteristics of a crop being harvested during the harvesting operation.

Example 20 is the method of any or all previous examples wherein probabilistically generating the set of estimated values comprises using a Bayesian network to generate the set of estimated values, using values represented by the sensor signals as evidence variables.

Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims.

What is claimed is:

1. An agricultural mobile machine, comprising:
a plurality of different sensors, each sensing a different variable and generating a corresponding sensor signal indicative of the sensed variable;
a plurality of different controllable subsystems;
a probabilistic controller configured to receive the sensor signals and generate a set of estimated variable values for unobserved variables and generate a plurality of different subsystem control signals to control the plurality of different subsystems, based on the sensor signals and the estimated variable values for the unobserved variables, wherein the probabilistic controller comprises a probabilistically inferred value generator that generates the estimated variable values for the unobserved variables;
a control signal generator that generates the plurality of different subsystem control signals: and
a material processing system that processes material in a harvesting operation and
wherein the probabilistically inferred value generator comprises:
a material stream volume estimator component that generates estimated values indicative of material volumes at different places in in the material processing system during the harvesting operation: and
a crop behavior characteristic estimator component that generates estimated values indicative of processing characteristics of a crop being harvested during the harvesting operation.

2. The agricultural mobile machine of claim 1 wherein the agricultural mobile machine comprises a combine.

3. The agricultural mobile machine of claim 2 wherein the control signal generator comprises:
a cost function analysis component that generates the plurality of different subsystem control signals based on a cost function and the estimated values estimated by the material stream volume estimator component and the crop behavior characteristic estimator component.

4. The agricultural mobile machine of claim 2 wherein one of the plurality of subsystems comprises a threshing subsystem that includes a concave and a rotor, and wherein one of the plurality of subsystem control signals comprises:
a concave clearance signal that controls concave clearance in the threshing subsystem.

5. The agricultural mobile machine of claim 4 wherein another of the plurality of subsystem control signals comprises:
a rotor speed control signal that controls rotor speed in the threshing subsystem.

6. The agricultural mobile machine of claim 2 wherein one of the plurality of subsystems comprises a cleaning subsystem that includes a chaffer, a sieve and a fan, and wherein one of the plurality of subsystem control signals comprises:
a chaffer opening control signal that controls a chaffer opening in the cleaning subsystem.

7. The agricultural mobile machine of claim 6 wherein another of the plurality of subsystem control signals comprises:
a sieve opening control signal that controls a sieve opening in the cleaning subsystem.

8. The agricultural mobile machine of claim 7 wherein another of the plurality of subsystem control signals comprises:
a fan speed control signal that controls a speed of the fan in the cleaning subsystem.

9. The agricultural mobile machine of claim 2 wherein one of the plurality of subsystems comprises a machine propulsion subsystem that drives movement of the combine over the ground and wherein one of the plurality of subsystem control signals comprises:
a ground speed control signal that controls the propulsion subsystem.

10. The agricultural mobile machine of claim 2 wherein one of the plurality of subsystems comprises a front end equipment subsystem with a header motor that controls header height of a header and wherein one of the plurality of subsystem control signals comprises:
a header height control signal that controls the header motor in the front end equipment subsystem.

11. The agricultural mobile machine of claim 2 wherein the probabilistic controller comprises:
a Bayesian network controller.

12. The agricultural mobile machine of claim 2 wherein the probabilistic controller models the unobserved variables using a hidden Markov model.

13. A combine, comprising:
a plurality of different sensors, each sensing a different variable and generating a corresponding sensor signal indicative of the sensed variable;
a plurality of different controllable subsystems;
a material processing system that processes material in a harvesting operation; and
a probabilistic controller configured to receive the sensor signals and generate a set of estimated variable values for unobserved variables and generate a plurality of different subsystem control signals to control the plurality of different subsystems, based on the sensor signals and the estimated variable values for the unobserved variables, wherein the probabilistic controller comprises a probabilistically inferred value generator that generates the estimated variable values for the unobserved variables; and wherein the probabilistic controller comprises:
a material stream volume estimator component that generates estimated values indicative of material volumes at different places in in the material processing system during the harvesting operation;
a crop behavior characteristic estimator component that generates estimated values indicative of processing characteristics of a crop being harvested during the harvesting operation: and
a control signal generator that generates the plurality of different subsystem control signals, based on the sensor signals and the estimated values.

14. A method of controlling a combine, comprising:
sensing a plurality of different variables;
generating a corresponding sensor signal indicative of each of the sensed variables;
probabilistically generating, using a probabilistic controller, a set of estimated variable values for unobserved variables based on the sensor signals, wherein the probabilistic controller comprises a probabilistically inferred value generator that generates the estimated variable values for the unobserved variables, wherein the combine includes a material processing system that processes material in a harvesting operation, and wherein probabilistically generating the set of estimated variable values comprises:
generating estimated values indicative of material volumes at different places in in the material processing system during the harvesting operation; and
generating estimated values indicative of processing characteristics of a crop being harvested during the harvesting operation: and
generating a plurality of different subsystem control signals to control a plurality of different subsystems, based on the sensor signals and the estimated variable values for the unobserved variables.

15. The method of claim 14 wherein probabilistically generating the set of estimated values comprises using a Bayesian network to generate the set of estimated values, using values represented by the sensor signals as evidence variables.

* * * * *